United States Patent
Butcher

[11] 3,711,158
[45] Jan. 16, 1973

[54] ROTARY TRENCHES HAVING ADJUSTABLE DEPTH CONTROL MEANS

[76] Inventor: Wilfred H. Butcher, Watertown, Minn. 55388

[22] Filed: Dec. 7, 1970

[21] Appl. No.: 95,544

[52] U.S. Cl. ..........................299/27, 37/94, 172/78, 299/39
[51] Int. Cl. ..............................................E02f 5/08
[58] Field of Search......................37/91–94; 172/78; 299/24, 25, 27, 39

[56] References Cited

UNITED STATES PATENTS

| | | | |
|---|---|---|---|
| 3,364,602 | 1/1968 | Renzaglia | 37/94 |
| 2,984,024 | 5/1961 | Prenner et al. | 37/94 |
| 2,969,601 | 1/1961 | McMaster | 37/94 |
| 2,910,129 | 10/1959 | Howard | 172/78 X |

Primary Examiner—Robert E. Pulfrey
Assistant Examiner—Clifford D. Crowder
Attorney—Williamson, Palmatier & Bains

[57] ABSTRACT

A trench-forming device includes an elongate boom which is swingably mounted on a transverse drive shaft of a vehicle. A revolvable blade is carried by the outer end of the boom and is driven by an endless chain and sprocket which is connected to the drive shaft of the vehicle. An adjustable depth-control member is mounted on the boom to permit adjustable control of the depth of the trench being formed.

1 Claim, 4 Drawing Figures

PATENTED JAN 16 1973 3,711,158

INVENTOR.
WILFRED H. BUTCHER
BY Williamson, Palmatier
& Bains
ATTORNEYS

3,711,158

ROTARY TRENCHES HAVING ADJUSTABLE DEPTH CONTROL MEANS

SUMMARY OF THE INVENTION

Currently there are various kinds of trench-forming or ditching machines which are used to dig trenches in the ground. However, while these machines are effective for digging trenches under normal conditions, these machines have been found to be ineffective for digging narrow trenches when the frost line extends several inches below the surface of the ground.

It is therefore a general object of this invention to provide a novel trench-forming device including a boom having a revolvable blade which may be mounted on and driven by conventional trenching vehicles. This novel trench-forming device is highly effective in cutting a relatively narrow trench in the ground even though the frost line extends substantially below the surface thereof.

Another object of this invention is to provide a novel trench-forming device of the class described which is provided with adjustable depth-control means to permit ready adjustment of the trench being dug.

DETAILED DESCRIPTION OF THE INVENTION

Figure 1:
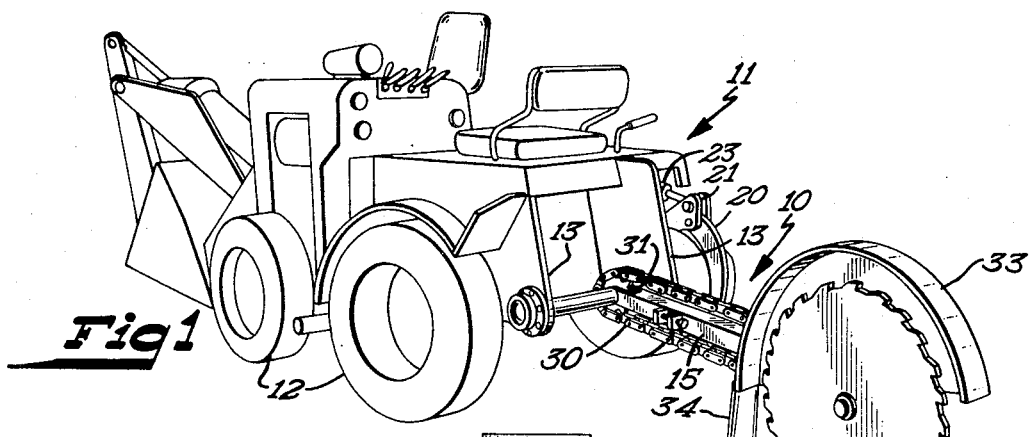
FIG. 1 is a perspective view illustrating the novel trench-forming device mounted on a conventional vehicle.

Referring now to the drawings, and more specifically to FIG. 1, it will be seen that one embodiment of the invention, designated generally by the reference numeral 10, is thereshown. This trench-forming device 10 is illustrated as mounted on and drivingly connected with a tractor 11 provided with suitable ground-engaging propulsion wheels 12. This tractor is of the type normally provided with a ditching implement at its forward end and a trench-forming implement at its rear end. The tractor 11 includes a body which is provided with rearwardly projecting generally vertically oriented plates 13. A drive shaft 14 extends between and is journaled in suitable bearings carried by the plates 13.

The trench-forming device 10 includes an elongate boom 15 which has a coupling member 16 fixedly connected thereto adjacent its inner end. The coupling member 16 includes a sleeve which is journaled upon the drive shaft 14 whereby the boom is mounted for vertical swinging movement about a substantially transverse horizontal axis. The coupling member 16 also has a laterally projecting pin 18 secured thereto which projects through an apertured arm 19 which is journaled about the drive shaft 14. The arm 19 is pivotally connected to one end of a link 20 which in turn is pivotally connected to one end of an elongate lever 21, the lever 21 being pivotally connected by a pivot 22 to the body of the tractor 11. A hydraulic piston and cylinder unit 23 is pivotally connected to the lever 21, and upon retraction and extension of the piston and cylinder unit the boom 15 may be swung vertically about its pivot axis between a raised and lowered position.

Figure 4:
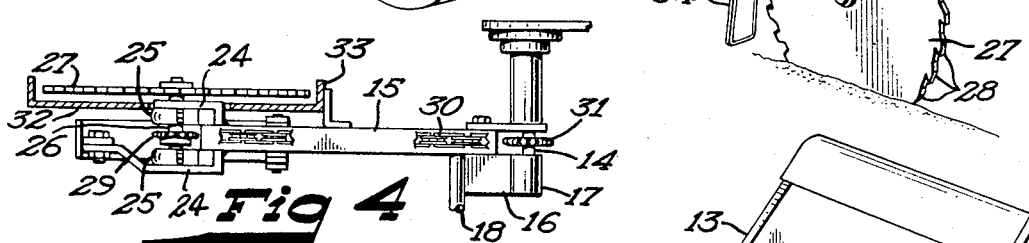
FIG. 4 is a top plan view of the trench-forming device with certain parts thereof broken away for clarity.
Figure 2:
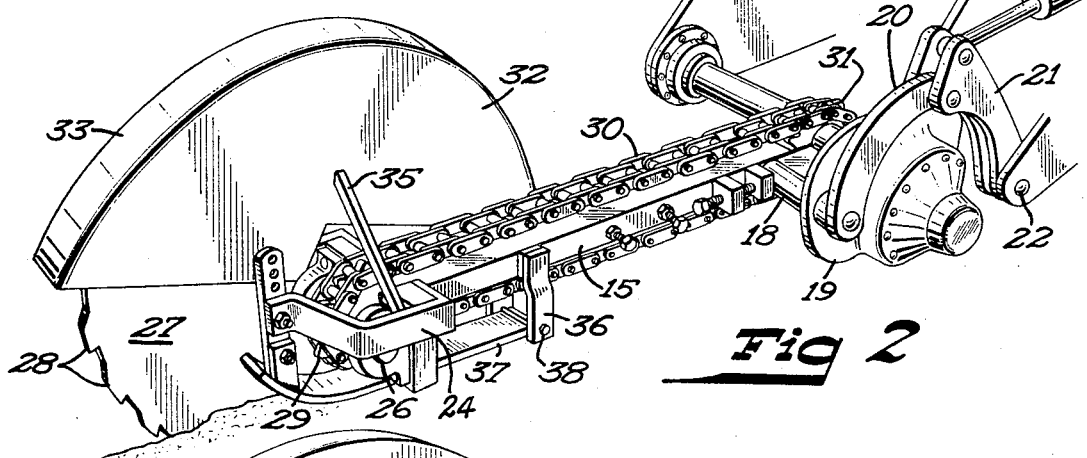
FIG. 2 is an enlarged front perspective view of the trench-forming device illustrating details of construction thereof.
Figure 3:
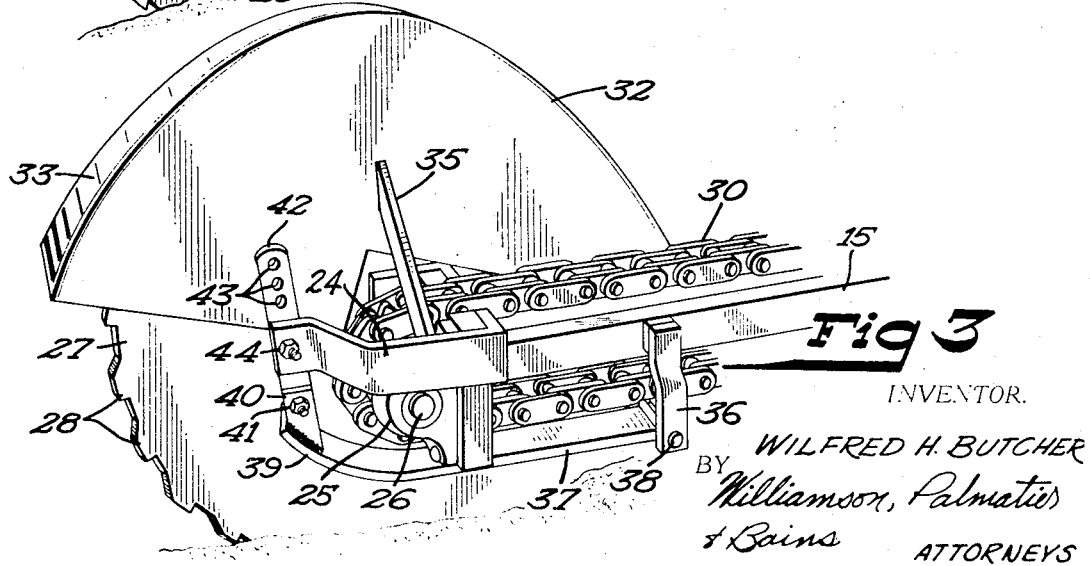
FIG. 3 is an enlarged fragmentary perspective view of the front portion of the trench-forming device illustrating the trench-forming blade and outer end of the boom.

The outer end portions of the boom 15 are provided with a pair of L-shaped brackets 24 which is secured to opposite surfaces of the boom as best seen in FIG. 4. A pair of pillow bearings 25 is mounted against opposite surfaces of the outer end of the boom 15 and is secured to the L-shaped brackets 24. A driven shaft 26 is journaled in the pillow bearings and a relatively large generally circular flat blade 27 is affixed to one end of the shaft 26. This blade 27 has teeth 28 formed in the periphery thereof and will be revolved to cut a trench in the ground surface when the shaft 26 is driven.

To this end, it will be seen that a sprocket 29 is affixed or otherwise secured to the shaft 26 for rotation therewith. An endless chain 30 is trained about the sprocket 29 and is also trained about a sprocket 31 which is keyed or otherwise affixed to the drive shaft 14. It will therefore be seen that when the drive shaft 14 is driven, the blade 27 will be driven by means of the sprocket and chain drive from the drive shaft.

The blade 27 is provided with a guard 32 which has a laterally projecting flange or rim 33 affixed thereto. It will be noted that the guard is of generally semi-circular configuration and is provided with a depending flap 34 which is secured to the flange or rim 33. The guard and flap cooperate with each other to prevent mud and other debris from being thrown towards the tractor. The guard 32 is directly affixed to one of the L-shaped brackets 24 and is fixedly connected to the other L-shaped bracket by a diagonal brace 35.

The boom 15 has a pair of depending straps 36 affixed thereto and depending from opposite sides thereof. An elongate substantially flat depth-control member 37 is pivotally connected to the straps 36 by means of a pivot 38. It will be noted that the outer end of the depth-control member 37 is arcuately bent upwardly and has a bracket 40 secured to the upper surface thereof. This bracket 40 is suitably apertured and is secured to the lower end of a vertically extending strap 42 by means of a nut and bolt assembly 41. The strap 42 is provided with a plurality of apertures 43 therein to permit accommodation of the nut and bolt assembly 44. This nut and bolt assembly serves to secure the strap 42 to the outer end portion of one of the L-shaped brackets 24, this projecting portion of the bracket also being provided with a suitable aperture therethrough. With this arrangement, the position of the depth-control member 37 may be varied with respect to the surface of the ground. It will be seen that, by positioning the nut and bolt assembly 44 through the uppermost of the apertures 43 in the strap 42, a shallow cut may be made in the surface of the ground. Alternatively, in the event that the nut and bolt assembly 44 is positioned in the lowermost of the apertures 43, as shown, then a relatively deep cut may be made in the surface of the ground.

During use, the trench-forming device 10 may be maintained in an elevated position until it is desirable to use the device. The depth-control member 37 will be adjusted to the desired position for the proper depth of the trench to be cut and the drive shaft 14 will then be revolved from the power-takeoff of the vehicle. The endless chain and sprocket drive will revolve the driven shaft 26 to revolve the blade 27. Thereafter, when the boom 15 is lowered, the blade 27 will cut a relatively narrow trench in the surface of the ground. The depth of the trench will be determined by the position of the depth-control member 37. Therefore, when the depth-control member 37 engages the surface of the ground, then the blade 27 will be prevented from digging further downwardly into the surface of the ground.

The operator may then move the tractor in a forward direction to pull the revolving blade along a predetermined course and thus form a relatively narrow trench. It has been found that the blade will readily cut through frozen ground even though the frost line extends to a depth of several inches. Thus the trench-forming device is ideal for forming trenches in which electrical conductors are placed, such as telephone service lines. It is also pointed out that the trench-forming device is readily adaptable for use with conventional trenching machines since many such machines do have a transverse horizontal rear drive shaft in the manner of that shown in the drawing. It has been found that the sawing or shearing action of the blade is highly effective in readily penetrating the surface of the ground even though it is frozen solid. Thus the trench-forming device is especially adaptable for use in areas that experience rather severe winters.

From the foregoing description it will be seen that I have provided a novel trench-forming device which is capable of being readily mounted on conventional trenching machines and the like and which is highly effective in forming relatively narrow trenches in frozen ground. It is also pointed out that the shaft 26 may be extended to permit mounting of the blade 27 on opposite ends thereof. Thus a pair of relatively narrow trenches may be formed simultaneously in the surface of the ground. If it is then desirable to remove the soil located between the two trenches, then this soil may be more easily excavated by an excavating implement. It will therefore be seen that the trench-forming device has a variety of uses.

Thus it will be seen from the foregoing description that I have provided a novel trench-forming device, which is not only of simple and expensive construction, but one which functions in a more efficient manner than any heretofore known comparable device.

What I claim is:

1. A trench-forming device for use with a vehicle having driven ground-engaging propulsion means and having a transverse horizontal drive shaft adjacent the rear end thereof, said device comprising, an elongate boom having an inner end and outer end, coupling means at the inner end of said boom swingably coupling said boom to the transverse shaft to permit vertical swinging movement of the boom about the shaft, a pair of bearing members mounted on opposite sides of said boom adjacent the outer end thereof, a revolvable driven shaft journaled in said bearing means and being disposed in substantially parallel relation to the drive shaft of the vehicle, a substantially flat generally circular blade affixed to said driven shaft and having a plurality of teeth in the periphery thereof, a guard member mounted on said boom and embracing at least a portion of said blade to prevent soil and the like from being thrown by the blade during operation of the blade, a pair of sprockets, one of which is secured to said driven shaft for rotation therewith, and the other sprocket adapted to be affixed to the transverse drive shaft of the vehicle for rotation therewith, an endless chain trained about said sprockets, an elongate substantially flat ground engaging depth-control member positioned below said boom adjacent the outer end thereof, and being engageable with the surface of the ground to limit penetration of the blade to the ground, said depth control member having an outer end arcuately bent upwardly and being pivotally connected adjacent its inner end with said boom to permit vertical swinging of the depth control member about a transverse horizontal axis spaced below said boom, an elongate apertured bracket secured to the outer end of said depth control member and projecting upwardly therefrom, means connected with the outer end portion of the boom and said bracket and being adjustable relative to the latter to variably limit the penetration of the blade into the ground.

* * * * *